United States Patent Office.

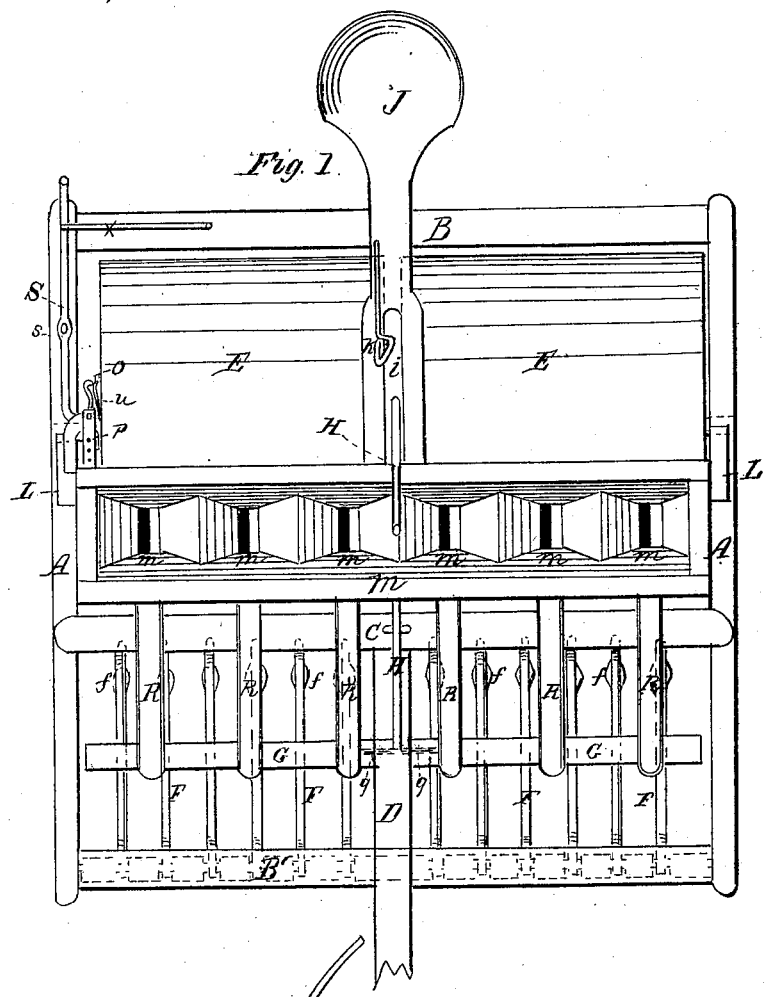
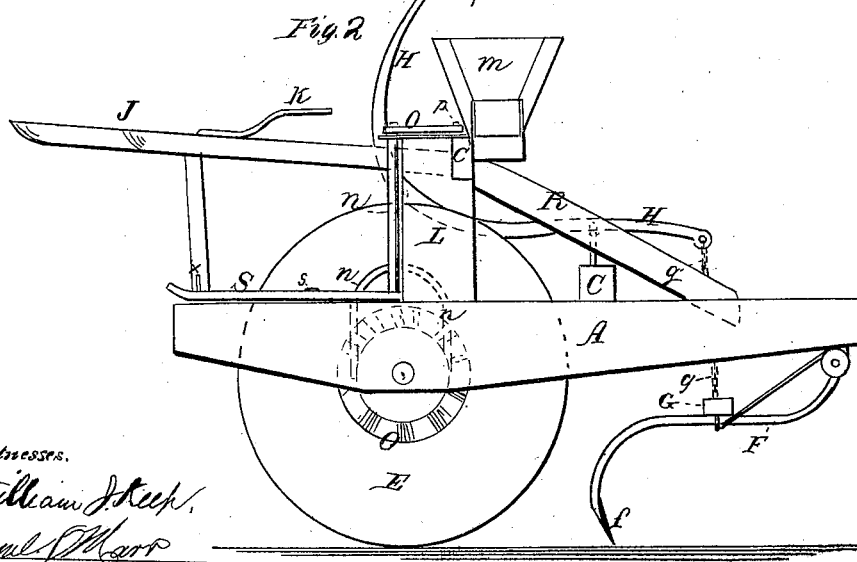

WILLIAM S. GROVER, OF OCONOMOWOC, WISCONSIN.

Letters Patent No. 92,186, dated July 6, 1869.

---

IMPROVEMENT IN COMBINED SEEDER, ROLLER, AND CULTIVATOR.

---

The Schedule referred to in these Letters Patent and making part of the same.

---

*To all whom it may concern:*

Be it known that I, WILLIAM S. GROVER, of Oconomowoc, in the county of Waukesha, and in the State of Wisconsin, have invented certain new and useful Improvements in Combined Seeders, Cultivators, and Rollers; and do hereby declare that the following is a full, clear, and exact description thereof, reference being had to the accompanying drawing, making a part of this specification, in which—

Figure 1 represents a plan view, and

Figure 2, a side elevation.

Letters of like name and kind refer to like parts in each of the figures.

The nature of my invention consists in the combination and arrangement of the several parts of the machine, whereby they are adapted to each other, and, when combined, are capable of performing the operations or offices of three usually distinct and separate devices, by which means great economy of space and expense is secured, and a more useful and convenient implement produced.

In the annexed drawing—

A A represent the side pieces of the frame, which are connected at their front and rear ends by cross-bars B B', and near their centre, lengthwise, by a tie-bar, C.

The rear end of the pole D is secured to the centre of the tie-bar C, and extends forward across the front cross-bar, B', to which it is also attached.

E E represent two rollers, pivoted upon a shaft, which rests in bearings secured to the under side of the side pieces A A, near their rear ends, so that said rollers shall furnish a support for the machine.

Pivoted at equidistant points upon the under side of the cross-bar B', is a series of rods or bars of iron, F F, &c., which extend downward, backward, and again downward to the ground in a double curve, as shown in fig. 1, and each serves as a support for a cultivator-share, *f*, of the usual form.

Extending laterally across the rods F, midway between their ends, is a bar, G, to which each rod is secured, for the purpose of retaining the shares *f f*, &c., at a uniform height, and also to enable said shares to be raised from the ground, when desired.

In order to accomplish the latter result, a lever, H, is pivoted upon the tie-bar C, and has its front end connected to said bar G, by means of a chain, *g*.

The rear end of said lever has an upward curve, bringing it within convenient reach of the operator, who sits upon a seat, I, supported by suitable means.

The plank, of which said seat forms a part, has a longitudinal slot, *i*, in which the lever H works, and also, near the rear end of said slot, is a spring-catch, K, which serves to retain the rear end of said lever when depressed, so as to elevate the cultivator-shares.

Rising perpendicularly from the side pieces A A, a little forward of the rollers, are two standards, L L, which are connected together by a cross-bar, C', and serve as a support for a hopper, M, the sides of which slope inward, in the usual manner.

The bottom of said hopper is provided with six or more oblong openings, *m m*, &c., and has beneath a false bottom, in which are openings corresponding to those in said hopper, said false bottom being so constructed as to slide laterally, in the usual manner.

N represents a vertical shaft, working within suitable bearings, placed directly over the axis of the roller, and provided, at its lower end, with two arms, *n n*, the lower ends of which may be caused to press against a corrugated ring of metal, O, secured to and revolving with said roller.

As the raised portions of said ring are directly opposite the depressions upon the opposite side of the same, it will be evident that if said arms *n n* are caused to press against said ring when the rollers are in motion, a reciprocating motion will be imparted to the shaft, which motion is communicated to the false bottom by means of an arm, P, secured to the upper end of said shaft, and a rod, *p*, connecting the same with said false bottom, whereby the openings *m m*, &c., are alternately opened and closed, so as to permit the escape of the seed through each into spouts, R R, &c., placed directly beneath, from whence it is conducted in front of the cultivator-shares and dropped upon the ground.

The lower end of the shaft N has a bearing within one end of a lever, S, which is pivoted, at *s*, upon the upper side of the side piece A, so as to permit a horizontal and lateral motion, by means of which the lower end of said shaft may be caused to press against or be removed from contact with the corrugated ring O, and the operation of the seeder controlled at will.

A spring-catch, *x*, is caused to engage with and lock the rear end of said lever S, when said seeder is in gear.

It will be seen, that by the use of this device, the seed is deposited upon the ground, where it is partly covered in by the cultivator-shares, after which the roller completes the operation, by entirely covering said seed and levelling the ground, so that the two men and a span of horses are enabled to perform, at one operation, the work which has heretofore required three machines, with a span of horses and from one to two attendants each.

If desired, the roller may be removed, and a pair of wheels substituted in place thereof, so as to permit of the use of the machine for seeding without rolling.

Having thus fully set forth the nature and merits of my invention,

What I claim as new, and desire to secure by Letters Patent, is—

1. The within-described agricultural implement, consisting of the frame A A, B and B, cross-bar C, rollers E E, cultivator-shares and supports $f$ and F, bar G, lever H, chain $g$, catch K, for raising said cultivator-shares, hopper M, with its false bottom, shaft N, provided with the arms $n\,n$, corrugated ring O, arm P, and rod $p$, for actuating said false bottom, spouts R R, lever S, and catch $x$, all combined and arranged substantially as and for the purpose specified.

2. Also, the vertical shaft N, provided with the arms $n\,n$, in combination with the corrugated ring O, substantially as and for the purpose shown.

In testimony that I claim the foregoing, I have hereunto set my hand, this 5th day of April, 1869.

WM. S. GROVER.

Witnesses:
GEORGE F. WESTOVER,
M. O. GROVER.